Feb. 14, 1933.  A. THOMAS  1,897,085
MACHINE FOR COMPARING STATISTICAL RECORD CARDS
Filed Dec. 21, 1931  3 Sheets-Sheet 2
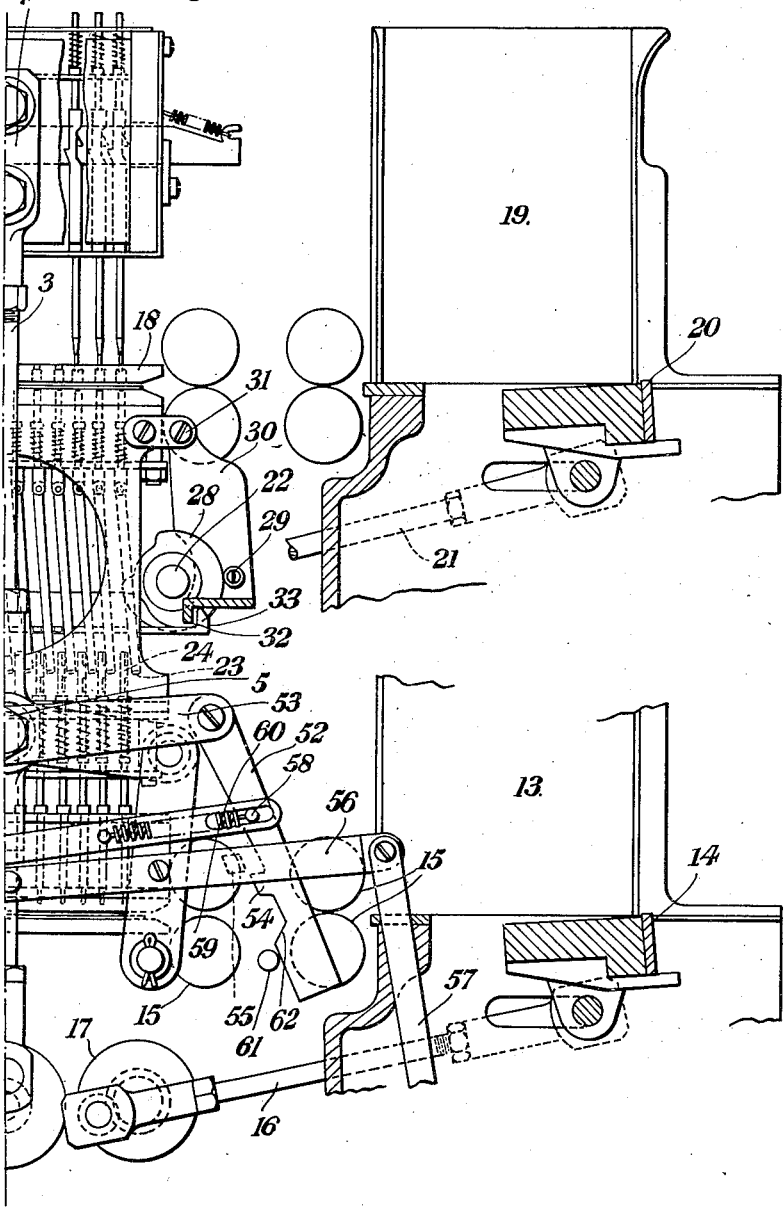
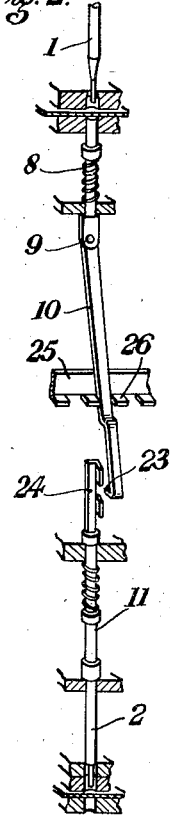
Inventor:
A. THOMAS,
per: Sydney E. Page.
Attorney.

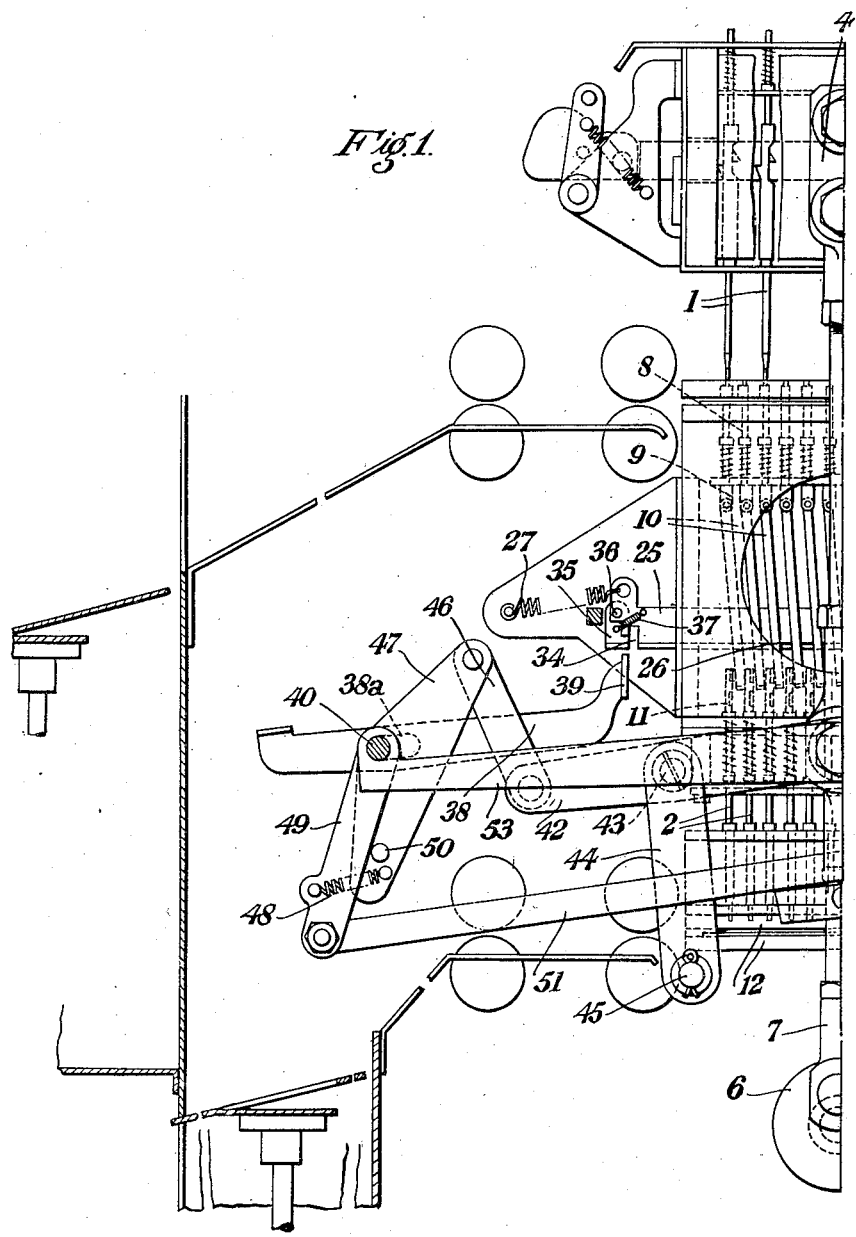

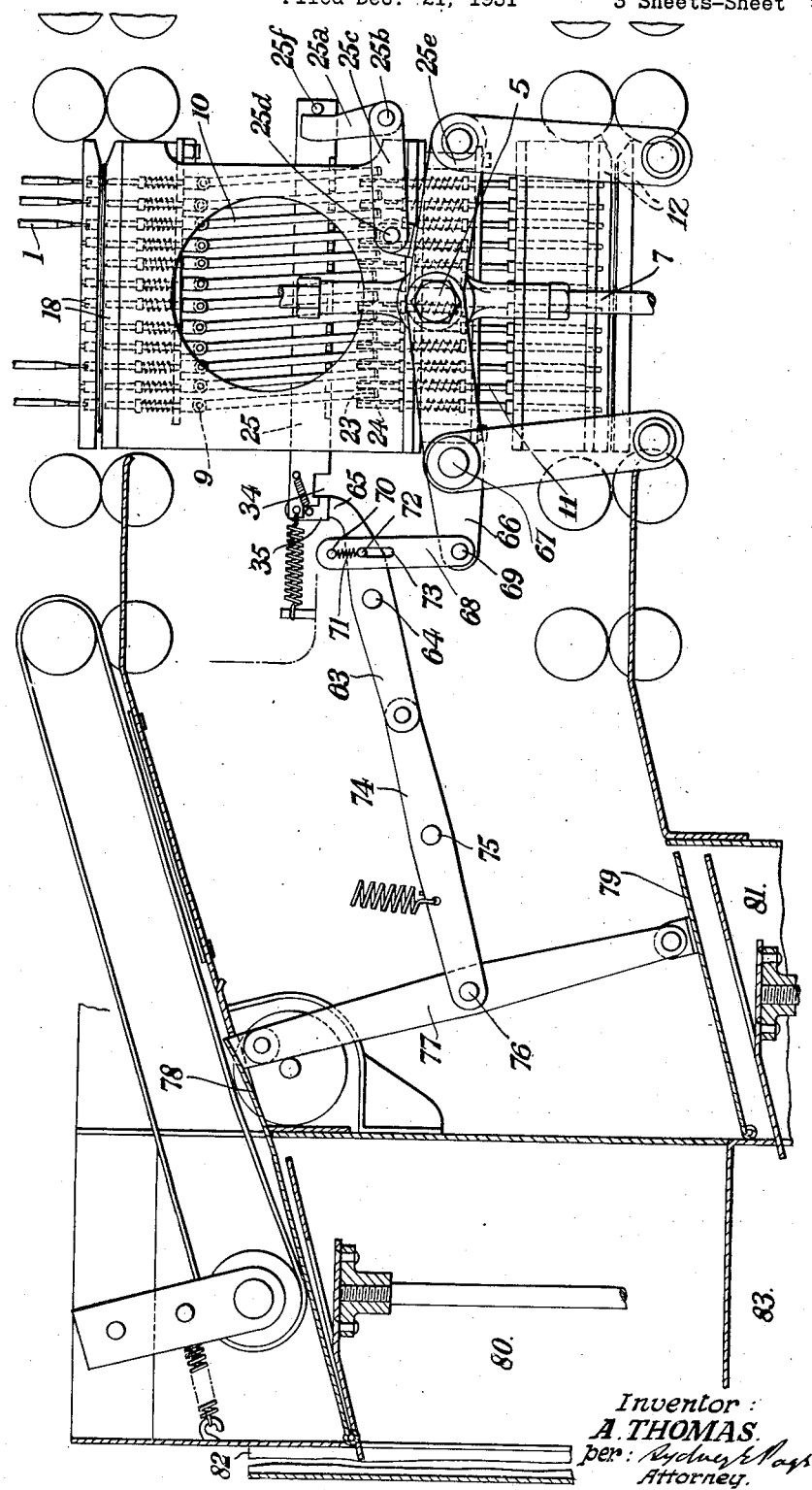

Patented Feb. 14, 1933

1,897,085

UNITED STATES PATENT OFFICE

ARTHUR THOMAS, OF WALLINGTON, ENGLAND, ASSIGNOR TO THE ACCOUNTING TABULATING CORPORATION OF GT. BRITAIN LIMITED, OF LONDON, ENGLAND

MACHINE FOR COMPARING STATISTICAL RECORD CARDS

Application filed December 21, 1931, Serial No. 582,378, and in Great Britain January 8, 1931.

This invention relates to machines for comparing statistical record cards or the like and has for its object to provide means for comparing the information recorded on one card with that recorded on another card.

In certain statistical systems pairs of cards are used for the purpose of computing taxation of say, a workman, by way of insurance or otherwise, and to this end one card of the pair, which may be referred to as the "red" card, contains a record made by way of perforations or otherwise in particular zones of the card, of domestic information relating to a workman which is required by a central authority, for example, the Government, to be supplied by the employer. The other card of each pair which may be termed the "green" card, shows the wages and hours of work and is used by the employer in order to compute this information. At intervals the employer returns the "green" cards and the central authority desires to compare them with the "red" cards. Clearly, as regards the domestic information, the red and green cards will be identical for any given individual. When the cards have been collected they are put through a sorting machine and mechanically brought into sequence, the green cards then being in the same order as the red cards.

The machine according to the invention is intended to be used for comparing the green and the red cards in order to ascertain whether the sequence is correct. It will thus be seen that the machine according to the invention is not intended to verify the correctness of entries recorded on the cards, but the similarity or nonsimilarity of the entries. The machine indicates whether the entries on two cards are alike or not irrespective of whether such entries are correct in themselves.

To this end a machine for comparing two supposedly similar sets of record cards according to the invention, comprises an upper sensing pin box, a lower sensing pin box, means for feeding a card from one set to the upper sensing pin box, means for simultaneously feeding a card from the other set to the lower pin box, a plurality of upper testing pins adapted to engage with the upper sensing pins, a plurality of lower testing pins adapted to engage with the lower sensing pins, a plurality of testing bars one for each column of upper testing pins, means acting upon said testing bars tending to tilt all the associated upper testing pins about one end, means for locking one set of testing pins against the other set, and means whereby when two record cards agree, said locking means is disengaged and permits movement of the testing bars, whereas when two cards do not agree the testing pins are locked and the testing bars prevented from moving.

The testing bars are used to control either the source of power for the machine or sorting compartments to which the cards are delivered. However, in either case the arrangement is such that when the testing bars fail to move the desired operation takes place, that is to say, either the machine is stopped or the cards are delivered into a particular compartment.

The invention may be carried out in various ways, but two constructions according thereto are illustrated diagrammatically by way of example in the accompanying drawings, in which Fig. 1 illustrates in elevation a pair of pin boxes for comparing cards provided with mechanism for stopping the machine when there is lack of agreement between two cards;

Fig. 2 illustrates a detail of the arrangement of the pins in the construction illustrated in Fig. 1, and Fig. 3 shows an alternative construction in which the cards which do not agree are delivered to a reject compartment.

In the construction shown in Fig. 1 the machine comprises an upper sensing pin box, of which the pins are indicated by the reference numeral 1, and a lower sensing pin box of which the pins are indicated by the reference 2. The two pin boxes are connected together by means of a coupling rod 3 connected at 4 and 5 to the pin box frames respectively. The pin boxes are reciprocated simultaneously by means of a crank disc 6 and connecting rod 7, the crank disc 6 being driven from the source of power of the machine.

Below the pins of the upper pin box is disposed a set of upper testing pins 8 which are articulated at 9 and have lower portions 10 which can swing about the pivot 9. Above the pins of the lower pin box is disposed a set of lower testing pins 11. The upper testing pins are disposed immediately beneath the upper sensing pins while the lower testing pins are disposed immediately above the lower sensing pins so that when an upper sensing pin passes through a hole in a card, it will move its corresponding testing pin downwards, while when a lower sensing pin passes through a hole in a card, it will move its corresponding testing pin downwards.

The lower ends of the sensing pins 1 in the upper pin box rest on the upper ends of the upper set of testing pins 8 which are spring pressed upwardly, while the upper ends of the pins 2 in the lower sensing pin box abut against the lower ends of the lower set of testing pins 11, which are spring pressed downwardly.

The lower pin box has pin plates 12 between which the cards are fed from the lower card magazine 13 by means of a picker 14 and feed rolls 15. The picker 14 is operated by means of a connecting rod 16 and crank disc 17 driven from the source of power for the machine. Similarly the upper pin box has pin plates 18 to which the cards are fed from the upper card magazine 19 by means of a picker 20 operated through a connecting rod 21 from a crank disc similar to the disc 17 and mounted on a shaft 22 likewise operated from the source of power of the machine in such a way that both pickers 14 and 20 feed cards from the lower and upper card magazines into their pin boxes simultaneously.

If a card which is in the upper pin box agrees with one which is in the lower pin box, corresponding sensing pins 1 and 2 in both boxes will pass through holes in the cards and consequently will move downwardly thereby causing downward movement of their respective testing pins. The lower end of the upper portion 10 of each upper testing pin is provided with a projecting lug 23 normally in register with a slot 24 in the upper end of the corresponding lower testing pin 11. Thus if two cards agree, the corresponding upper and lower testing pins will either both have moved downwardly or both have remained stationary and the lug 23 of the upper testing pin will still be in register with the slot 24 of the lower testing pin.

In order to indicate lack of agreement between the cards of a pair passing through the pin boxes a testing bar 25 is provided for each card column which has comb teeth 26 engaging with the pivoted portions 10 of all the upper testing pins of that column and is adapted to be reciprocated transversely of these pins once for each cycle of the pin boxes at the moment when both upper and lower pins are fully in sensing position. As the testing bar moves across and back it will tilt the portions 10 of the upper testing pins about their hinges 9 and the lugs 23 on their lower ends will pass through the slots 24 of the upper ends of the lower testing pins 11. If, however, there is lack of agreement between the two cards, the result will be that for a given upper sensing pin 1 which has passed through a hole in a card, a corresponding lower sensing pin 2 will not have found a hole through which it can pass, or vice versa. Consequently, there will be relative movement between the corresponding testing pins and the lug 23 on the upper testing pin will no longer be in register with the slot 24 in the corresponding lower testing pin. Consequently, when the testing bar 25 attempts to move across the lug 23 will be unable to pass through the slot 24 and consequently the movement of the testing bar will be prevented.

This arresting of the testing bar is utilized either to stop the machine or to operate the flap of a reject compartment to receive the cards which do not agree. Each testing bar is connected to the pin box frame by means of a spring 27 which tends always to pull it over to one side of the machine, while by means to be described later, the testing bars are pulled across the pin box against the action of the springs once during each cycle of the pin box.

It will be observed that in order to prevent damage to the parts it is the springs 27 which initiate the actual testing movement, the bars 25 being returned positively by mechanically operating gear.

In order to operate the testing bars 25, a cam 28 is secured to the shaft 22 and engages with a roller 29 on an arm 30 pivoted to the pin box frame at 31. This arm carries a shoulder 32 which engages with a shoulder 33 on the testing bars and pulls them all over to the right in Fig. 1 once for each machine cycle. This cam 28 operates to allow the testing bars to make a testing stroke when the pin boxes are at the bottom of their stroke and the arrangement is such that before the pin box rises the testing bars are moved positively to the right in Fig. 1. The upward movement and the following downward sensing movement are made when the testing members 8 and 11 are clear of each other.

In the construction shown in Fig. 1 in which the testing bars 25 are used to control the source of power to the machine, each testing bar 25 is provided with a notch 34 in its underside at one end. One wall of this notch is formed by a portion of the testing bar itself, while the other wall is formed by a latch 35 pivoted to the testing member at 36 and connected thereto by means of a spring 37. Disposed beneath each testing bar is a testing lever 38 carrying at one end an upturned projection 39 adapted to rise into engagement with the corresponding testing bar 25. All the testing levers 38 are secured to a common spindle 40 which is mounted in bearings in the machine frame and is oscillated through link work from the driving mechanism for the pin boxes. This link work comprises a lever 42 mounted at one end of the pivot 5 to which the driving connecting rod 7 for the pin boxes is attached. At a point 43 between its ends this lever is attached pivotally to a link 44 of which the other end is pivoted at 45 to the machine frame. The free end of the lever 42 is connected by a link 46 to an arm 47 freely mounted on the shaft 40. Thus as the pin boxes reciprocate the arm 47 is rocked by means of the lever 42 and link 46. The arm 47 is connected by means of a spring 48 to an arm 49 attached to the shaft 40 and the arm 47 also carries a pin 50 against which the spring 48 tends to pull the arm 49. Thus as the arm 47 oscillates the arm 49 tends to be pulled from left to right in Fig. 1 by means of the spring and to be pushed from right to left by means of the pin 50.

The testing levers 38 are attached to the shaft 40 in such a manner that they can be moved in the line of the slot 38a, but must always move angularly with the shaft. Thus by pulling any one or more testing levers over to the left in Fig. 1 they can be brought out of operation so that they do not engage with the testing bars 25.

It will be seen that as the pin boxes descend the arm 47 is rocked in an anti-clockwise direction and by the action of the spring 48 pulls the arm 49 also in an anti-clockwise direction, thereby rocking the shaft 40 and raising the upturned ends 39 of the levers 38.

If there is agreement between the cards in the upper and lower pin boxes, all the testing bars 25 will be able to move across under the action of their springs 27, thereby bringing the slots 34 into position above the ends 39 of the testing levers 38. Consequently, when the testing levers are raised their ends 39 will be able to enter the notches 34 so that the shaft 40 will be able to turn to its fullest extent. On the other hand if any testing bar 25 is prevented from moving across by reason of lack of agreement between two cards, the end 39 of the corresponding testing lever 38 will engage the underside of the latch 35 on the testing bar 25. Consequently although the arm 47 will continue to turn the arm 49 and shaft 40 will be unable to follow it and the spring 48 will, therefore, be extended.

The arm 49 is connected at its free end by means of a control rod 51 to a lever 52 serving to control the switch for the driving motor of the machine. The switch control lever 52 is pivoted at its upper end to a lever 53 which is pivoted between its ends on the pivot 5 already mentioned. The other end of the lever 53 is supported on the shaft 40. Thus the right hand end of the lever 53 in Fig. 1 reciprocates with the pin boxes and, therefore, moves the switch control lever 52 up and down with it.

The lever 52 has near its lower end a projection 54 by means of which it can engage a projection 55 on a lever 56, which is connected by pin 55 on a lever 56, which is connected by means of a link 57 to the switch whereby the switch may be thrown open by means of the lever 52.

In order to control the operation of the lever 52, it is connected by means of the control rod 51 already described, to the arm 49 of the shaft 40. The connection between the control rod 51 and the switch control lever 52 is made by means of a pin 58 and slot 59, and a spring 60 is provided which tends to move the lever 52 so that the pin 58 engages with the inner end of the slot 59. This spring is fitted to enable the control rod 51 to be positively restored before the control lever 52 is released.

The operation of the machine is as follows:

If all the testing bars 25 move across by reason of two cards being in agreement, the notches 34 in their under edges come into position above the upwardly direc'ed projections 39 on the corresponding testing levers 38 and as the shaft 40 turns the projections enter the notches. This movement of the testing levers 38 is accompanied by a corresponding movement of the arm 49 attached to the shaft 40, whereby the control rod 51 is pushed over sufficiently to hold the arm 52 out of possible engagement with the pin 55 on the lever 56.

At the same time the pin box descends and brings the horizontal lever 53 down with it whereby the switch control lever 52 is lowered until its lug 54 is on a level lower than the pin 55. The switch control lever 52, however, is held clear by its pin 58 being in engagement with the inner end of the slot 59 in the control rod 51. Therefore, the lug 54 cannot engage with the pin 55 and open the switch.

If, however, any testing bar 25 is prevented from moving by reason of disagreement between two cards, the upturned projection 39 of the corresponding testing lever 38 comes to rest against the lower edge of the lug 35 on the testing bar. Consequently the arm 49 will not make its full movement and the spring 48 will be stretched. Hence, the control rod 51 will not be moved sufficiently to remove the lug 54 on the switch control lever 52 out of engagement with the pin 55. Consequently, once the lug 54 on the switch control lever has moved down to a lower level than the adjacent pin 55, the switch control lever is pulled in a clockwise direction by means of the spring 60 until its lug 54 engages under the switch operating pin 55. On the following up-stroke of the pin box, the switch control lever 52 is raised and lifts with it the switch operating pin 55, thereby switching off the machine.

Beneath the lug 54 is disposed a fixed pin 61 adapted to engage with a cam surface 62 on the switch control lever 52 in such a way that after the operation of the switch, as this lever 52 rises further, the cam surface 62 rides over the pin 61 and resets the lever 52 by withdrawing the lug 54 from below the operating pin 55.

It will be understood that the testing bars 25 commence to move back towards the right in Fig. 1, before the ends 39 of the testing levers 38 are drawn from the slots 34. In order to render this possible the latch 35 is provided, this latch yielding at the expense of the spring 37 until the ends 39 of the testing levers 38 have been withdrawn from the notches 34.

In the construction shown in Fig. 3, the testing bars are used to control compartments for the reception of the cards, and as herein before described each testing bar 25 is provided with a notch 34 in its under side and a latch 35. In this construction each testing bar 25 is operated by an arm 25a secured to a cross rod 25b. The cross rod carries at each end a link 25c pivoted at 25d to a lever 25e connected at one end to the pivot 5 and at the other end to a link (not shown) similar to the link 44 in Fig. 1. Each arm 25a engages with a pin 25f on its respective testing member 25 whereby the testing member is positively moved in one direction.

Adjacent the right hand end of each testing bar in Fig. 3 is disposed a testing lever 63 pivoted at 64 and having a nose 65 normally in engagement with the under surface of the respective testing bar.

The testing levers 63 tend to be moved upwardly, i. e., in an anti-clockwise direction about their pivots, each time the pin box moves down and are operated from the pin box by means of a lever 66 pivoted at 67 to a fixed part of the machine and having one end (not shown) pivoted to the pin box. The other end of this lever carries a link 68 connected to the testing lever 63 by mechanism described below. The actual construction comprises two levers 66, one at each side of the pin box and a rod 69 connecting the ends of these levers. This rod 69 carries a plurality of links 68 one for each testing lever 63.

When the pin box moves down, the levers 66 turn in a clockwise direction about their pivots and push all the links 68 upwards. Each link 68 carries a pin 70 connected by means of a spring 71 to a pin 72 on the corresponding testing lever so that as the link 68 moves up, the testing lever is pulled in an anti-clockwise direction about its pivot by means of the spring 71. A slot 73 in the link 68 is so arranged that when the link 68 moves down it pulls the testing lever downwards positively by means of the engagement of the upper end of the slot with the pin 72 on the testing lever.

If two cards agree the testing bar 25 will have moved across until the recess 34 therein is in register with the nose 65 of the testing lever, so that when the testing lever is turned in an anti-clockwise direction about its pivot the nose will enter the recess. The other end of the testing lever is pivoted to an intermediate lever 74 pivoted between its ends at 75 and connected at its other end 76 to a link 77 connecting the flaps 78 and 79 of two compartments 80 and 81 to receive the cards from the upper and lower pin boxes respectively.

If on the other hand the testing bar does not move by reason of lack of agreement between two cards the nose of the testing lever will rest against the underside of the testing bar and consequently the testing lever will not be able to tilt so that the link 68 will move upward at the expense of tensioning the spring 71. Consequently the flaps 78 and 79 will not be opened and the cards will pass over the top of them into the reject boxes 82 and 83 respectively.

Further, although the invention has been described in its application to a card comparing machine it is to be understood that the invention also comprises a method of comparing two sets of supposedly similar record cards, sheets or the like consisting in simultaneously sensing the records and utilizing relative movement, occurring on disagreement of said records, between sensing elements or mechanism actuated thereby to cause a record or signal indicating the lack of similarity.

It will also be appreciated that the invention provides means for selecting the particular column or columns in which a comparing operation is to be performed. For example, as already explained, the testing levers may be slotted so as to be capable of sliding transversely on the shaft upon which they are mounted, thereby rendering it possible to cut out one or more columns. Thus the machine according to the invention is not restricted in its use to the comparing of the whole of the fields of two cards, but can be used to compare selected fields or selected columns.

I claim :—

1. In a machine for comparing two supposedly similar sets of record cards, the combination of an upper sensing pin box, a lower sensing pin box, means for feeding a card from one set to the upper sensing pin box, means for simultaneously feeding a card from the other set to the lower pin box, a plurality of upper testing pins adapted to engage with the upper sensing pins, a plurality of lower testing pins adapted to engage with the lower sensing pins, a plurality of testing bars one for each column of upper testing pins, means acting upon said testing bars tending to tilt all the associated upper testing pins about one end, means for locking one set of testing pins against the other set and means whereby when two record cards agree, said locking means is disengaged and permits movement of the testing bars, whereas when two cards do not agree the testing pins are locked and the testing bars prevented from moving.

2. In a machine for comparing two supposedly similar sets of record cards, the combination of an upper sensing pin box, a lower sensing pin box, means for feeding a card from one set to the upper sensing pin box, means for feeding a card from the other set to the lower sensing pin box, a set of upper testing pins one associated in operative relation with each sensing pin in the upper sensing pin box, a corresponding set of lower testing pins one associated in operative relation with each sensing pin in the lower sensing pin box, whereby when two cards do not agree, relative longitudinal movement occurs between the corresponding upper and lower testing pins, a plurality of testing bars, one for each column of testing pins in one set, each of said testing bars engaging with all the testing pins in its respective column, means acting upon said testing bars tending to tilt all the associated testing pins about one end, and means whereby when longitudinal movement occurs between two corresponding upper and lower testing pins, owing to disagreement between two cards, said pins become locked and the associated testing bar is accordingly prevented from moving, whereas when the cards agree the testing pins become unlocked and the testing bar can move.

3. In a machine for comparing two supposedly similar sets of record cards, the combination of mechanism for simultaneously feeding a card from each set, mechanism for sensing at one operation perforations on one of said cards, mechanism for simultaneously sensing corresponding perforations on the other card, a set of testing members one associated in operative relation with each sensing member in one sensing mechanism, a corresponding set of testing members one associated in operative relation with each sensing member in the other sensing mechanism, a plurality of testing bars one for each column of testing members in one set, each of said testing bars engaging with all the testing members in its respective column, means acting upon said testing bars tending to tilt all the associated testing members about one end, means for locking one set of testing members against the other set, means whereby when two record cards agree, said locking means is disengaged and permits movement of the testing bars, whereas when two cards do not agree the testing members are locked and the testing bars prevented from moving, indicating mechanism and operative connections between said indicating mechanism and the testing bars, whereby when the said bars fail to move, an indication is given of the lack of agreement between the cards.

4. In a machine for comparing two supposedly similar sets of record cards, the combination of mechanism for simultaneously feeding a card from each set, mechanism for sensing at one operation perforations on one of said cards, mechanism for simultaneously sensing corresponding perforations on the other card, a plurality of testing members one associated in operative relation with each sensing member in one sensing mechanism, a corresponding plurality of testing members one associated in operative relation with each sensing member and the other sensing mechanism, whereby when two cards do not agree, relative longitudinal movement occurs between at least two corresponding testing members, a plurality of testing bars one for each column of testing members in one set, each of said testing bars engaging with all the testing members in its respective column, means acting upon said testing bars tending to tilt all the associated testing members about one end, means whereby when longitudinal movement occurs between two corresponding testing members owing to disagreement between two cards, said testing members become locked and the associated testing bar is accordingly prevented from moving, whereas when the cards agree, the testing members become unlocked and the testing bars can move, mechanism controlling the source of power to the machine and operative connections between the testing bars and said controlling mechanism, whereby when the testing bars fail to move, the source of power is cut off and the machine is stopped.

5. In a machine for comparing two supposedly similar sets of record cards, the combination of mechanism for simultaneously feeding a card from each set, mechanism for sensing at one operation perforations on one of said cards, mechanism for simultaneously sensing corresponding perforations on the other card, a plurality of testing members one associated with each sensing member in one sensing mechanism, a corresponding plurality of testing members one associated with each sensing member in the other sensing mechanism, a plurality of testing bars one for each column of testing members in one set, each of said testing bars engaging with all the testing members in its respective column, means acting upon said testing bars tending to tilt all the associated testing members about one end, means for locking one set of testing members against the other set, means whereby when two record cards agree, said locking means is disengaged and permits movement of the testing bar, whereas when two cards do not agree, the testing members are locked and the testing bars prevented from moving two pairs of compartments for the reception of compared cards, mechanism for controlling the mouths of said compartments and operative connections between the testing bars and said mechanism, whereby when the testing bars fail to move, one pair of compartments is opened to receive the cards, whereas when the testing bar is permitted to move the other pair of compartments is opened.

6. In a machine for comparing two supposedly similar sets of record cards, the combination of an upper sensing pin box, a lower sensing pin box, means for feeding a card from one set to the upper sensing pin box, means for feeding a card from the other set to the lower sensing pin box, a set of upper testing members, one associated in operative relation with each sensing pin in the upper sensing pin box, a corresponding set of lower testing pins, one associated in operative relation with each sensing pin in the lower sensing pin box, whereby when two cards do not agree relative longitudinal movement occurs between the corresponding upper and lower testing pins, a plurality of testing bars each having a recess therein, one for each column of testing pins in one set, each of said testing bars engaging with all the testing pins in its respective column, means acting upon said testing bars tending to tilt all the associated testing pins about one end, a lug on each testing pin in the set of tiltable pins, a slotted member on each testing pin in the other set, whereby when there is agreement between two cards, the lugs are opposite the slots and can pass therethrough when the pins are tilted by the testing bars, whereas when there is disagreement the lugs are displaced relatively to the slots and the pins cannot tilt, a plurality of pivoted testing levers, means for turning all said testing levers about their pivot once for each cycle of the machine, whereby when the testing pins are tilted and the testing bars consequently permitted to move, the testing levers enter the recesses in the associated testing bars, whereas when there is disagreement between two cards and the pins cannot tilt and the testing bars are consequently held up, the testing levers are prevented from entering the recesses and are consequently also held up, mechanism for controlling the source of power to the machine and operative connections between the testing levers and said controlling mechanism, whereby when the testing levers are held up the source of power is cut off and the machine stopped.

7. In a machine for comparing two supposedly similar sets of record cards, the combination of an upper sensing pin box, a lower sensing pin box, means for feeding a card from one set to the upper sensing pin box, means for feeding a card from the other set to the lower sensing pin box, a set of upper testing members, one associated in operative relation with each sensing pin in the upper sensing pin box, a corresponding set of lower testing pins, one associated in operative relation with each sensing pin in the lower sensing pin box, whereby when two cards do not agree relative longitudinal movement occurs between the corresponding upper and lower testing pins, a plurality of testing bars each having a recess therein, one for each column of testing pins in one set, each of said testing bars engaging with all the testing pins in its respective column, means acting upon said testing bars tending to tilt all the associated testing pins about one end, a lug on each testing pin in the set of tiltable pins, a slotted member on each testing pin in the other set, whereby when there is agreement between two cards, the lugs are opposite the slots and can pass there-through when the pins are tilted by the testing bars, whereas when there is disagreement the lugs are displaced relatively to the slots and the pins cannot tilt, a plurality of pivoted testing levers, means for turning all said testing levers about their pivot once for each cycle of the machine whereby when the testing pins are tilted and the testing bars consequently permitted to move, the testing levers enter the recesses in the associated testing bars, whereas when their is disagreement between two cards and the pins cannot tilt and the testing bars are consequently held up, the testing levers are prevented from entering the recesses and are consequently also held up, two pairs of compartments for receiving the compared cards, mechanism for controlling the mouths of said compartments, and operative connections between the testing levers and said controlling mechanism, whereby when the testing levers are held up, one pair of compartments is opened while when the testing levers are permitted to enter the recesses the other pair of compartments is opened.

In testimony whereof I affix my signature.

ARTHUR THOMAS.